Sept. 6, 1960  K. LUFT  2,951,939
DEVICES FOR ANALYZING FLUID MIXTURES BY ABSORPTION OF RAYS
Filed May 4, 1956

INVENTOR
Karl Luft
BY
Bailey, Stephens & Huettig
ATTORNEYS

United States Patent Office 2,951,939
Patented Sept. 6, 1960

2,951,939

DEVICES FOR ANALYZING FLUID MIXTURES BY ABSORPTION OF RAYS

Karl Luft, Massy, France, assignor to Office National d'Etudes et de Recherches Aeronautiques O.N.E.R.A., Chatillon-sous-Bagneaux, France, a French society Filed May 4, 1956, Ser. No. 582,875

Claims priority, application France May 7, 1955

6 Claims. (Cl. 250—43.5)

The present invention relates to a device for analyzing fluid mixtures, and in particular gas mixtures, by selective absorption of waves of given wave-lengths from a beam of rays.

It has already been proposed to send the ray beam, after it has passed through the mixture to be analyzed, into a receiver layer constituted by the fluid itself the relative amount of which in the fluid mixture is to be found. It is also possible to use, as receiver layer, instead of the fluid to be measured itself, a fluid having substantially the same absorption wave bands as said component to be measured. Such a receiver layer detects only the rays located in the absorption bands of the fluid or gas to be measured or possibly of other gases insofar as the absorption bands of these last mentioned gases overlap those of the gas to be measured. Therefore this receiver is selective receiver.

Gas analyzers of this kind generally utilize two identical selective receivers which absorb the rays of predetermined wave-length contained in two ray beams one of which, before reaching its selective receiver, has passed through a sample cell containing the mixture to be analyzed, whereas the other beam, before reaching its respective receiver, has passed through a cell containing a gas having no absorption effect for the wave-lengths that are considered and serving only as comparison gas.

However the use of two different beams involves some difficulties. First, these beams may be subjected to different influences during their travel, which makes it relatively difficult to obtain a stable zero of the device. Furthermore, when the mixtures to be analyzed include components the absorption bands of which overlap each other, accuracy of the measurement is often insufficient, since compensation of the disturbing effects, by means of simple methods, is very difficult.

It has also been proposed to utilize a single beam instead of two beams and to measure the difference between the selective absorption effect in a first receiver layer constituted by the gas to be measured and the effect of non-selective absorption of the residual rays. However, by thus measuring the difference between a selective effect and a total and non-selective effect, other difficulties are experienced which result from the entirely different nature of these two phenomena.

The chief object of my invention is to permit, by means of a single beam, of obtaining an improved stability and also to increase selectively and to permit a relatively easy compensation of disturbing effects.

The device according to my invention is characterized in that the selective receiver substance is divided into two distinct portions located in respective cells, said portions being constituted by the same fluid, through which passes the ray beam which has already passed through the sample cell which contains the mixture to be analyzed, measurement means being provided to measure either the difference between, or the ratio of, the amounts of energy absorbed from said ray beam by said two detector cells, respectively. The difference or the ratio thus measured supplies an indication of the importance of the partial absorption undergone by the ray beam during its passage through the sample cell, and therefore it permits of measuring the amount of the component that is considered in the mixture present in said cell.

Preferred embodiments of my invention will be hereinafter described wtih reference to the accompanying drawings, given merely by way of example and in which:

Fig. 1 diagrammatically shows a first embodiment of my invention.

Figure 1:
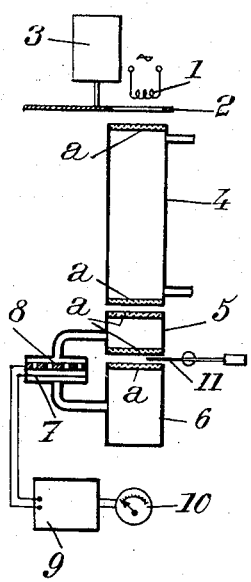

The analyzer device for gaseous mixtures illustrated by the drawings includes a source 1 supplying a beam of infra-red rays, this source being for instance constituted by a filament, such as a Nichrome filament heated at about 700° C., which thus emits a wide continuous band of rays. I provide, downstream of this ray source 1, a rotating shutter 2 having for instance the shape of a semi-circular plate or of a disc provided with holes, this shutter being driven by a motor 3 and serving periodically to cut off the ray beam with a given frequency.

This periodically interrupted beam is made to pass through a sample cell 4 containing the mixture to be analyzed. This ray beam, when issuing from cell 4, then passes through two detector cells 5 and 6 disposed one behind the other and filled with the same receiver gas, which may be either the gas to be measured in the mixture present in cell 4, or a mixture containing, in addition to said gas to be measured, another gas which is non absorbent. For instance, if the gas to be measured in the mixture contained in cell 4 is carbon monoxide (CO), the detector cells 5 and 6 may be filled either with pure CO or with a mixture of CO with nitrogen ($N_2$) or with argon (Ar).

In order to enable the ray beam to pass successively through cells 4, 5 and 6, both ends of cells 4 and 5 and the inlet end of cell 6 are made of a material $a$ through which the rays are able to pass without any material absorption thereof.

In order to measure the selective absorption of the infra-red rays into the two detector cells 5 and 6, I may use any suitable parameter such as the variation of temperature or the variation of pressure in these cells. When use is made, as parameter, of the pressure, these chambers may be connected with a diaphragm condenser the electrodes of which are constituted by a movable diaphragm 7 and a fixed armature 8. The variations of capacity produced by the displacements of diaphragm 7 are transformed into voltage variations, which are amplified in an amplifier 9 and measured in a suitable measurement instrument 10.

A diaphragm 11, interposed between the two detector cells 5 and 6, serves to obtain zero adjustment.

The operation of my device is based upon phenomena a short description of which will now be given. The absorption band of a gas is characterized by a plurality of lines the intensities of which are distributed, according to the Maxwell-Boltzmann law, and the widths of which are not negligible. It is known that the layer of gas necessary for fully absorbing the rays the wave-length of which corresponds to the middle portion of each line is of a thickness considerably smaller than that of the layer of gas necessary for wholly absorbing the rays the wave-length of which corresponds to the marginal portions of the lines. In other words, a layer of gas the thickness of which is insufficient for wholly absorbing the rays the wave-lengths of which correspond to the absorption band of the gas that is considered, has a more intensive effect for the wave-lengths corresponding to the middle portion of said lines than for the wave-lengths corresponding to the marginal portions of said lines.

If these considerations are applied to the present invention, it is found that detector cell 5 the height of which is chosen so that it absorbs only a portion of the rays that enter it, has a preferential absorption effect on the wave-lengths corresponding to the middle portions of the lines of the absorption bands, whereas detector cell 6 receives a ray beam from which have already been absorbed most of the rays corresponding to the marginal portions of the lines, whereby this cell 6 absorbs chiefly rays corresponding to the marginal portions of the lines.

Preferably, the apparatus is adjusted in such manner that the amounts of energy absorbed in the two respective detector cells 5 and 6 are substantially equal and produce an approximative equality of the measured parameters when the gaseous mixture in cell 4 does not include the gas to be measured, so that, in the ray beam emitted from source 1 with a given intensity, the wave-lengths corresponding to the absorption band of the gas to be measured pass through said cell 4 without being weakened.

In this case, which corresponds to zero point of the measurement, the absorption in cell 5 of the rays the wave-lengths of which are those of the middle portions of the lines may be as high as 90%. When subsequently cell 4 is filled with a gaseous mixture which contains some amount of the gas to be measured, this mixture, according to the phenomena above referred to, absorbs chiefly a portion of the rays the wave-lengths of which correspond to the middle portions of the lines. Consequently, the balance which existed before this between the energies absorbed in the two detector cells 5 and 6 no longer exists and there is a higher amount of energy absorbed by cell 6, since the initial balance was based upon the fact that cell 5 received a radiation containing, without any preliminary weakening, the rays the wave-lengths of which correspond to the middle portions of the lines. The higher the percentage of the gas to be measured in the mixture present in cell 4, the greater the difference between the energies absorbed in cells 5 and 6, so that it is possible accordingly to determine the percentage of gas to be measured in the mixture.

In order to obtain the optimum difference or ratio between these amounts of energies absorbed in cells 5 and 6, for a given concentration of the gas in the mixture present in cell 4, it is necessary to determine the partial pressure of the receiver gas in said detector cells 5 and 6, the total pressure in these cells (when they contain, in addition to the receiver gas, still another gas which does not absorb the rays that are used to serve to dilute the first gas and to widen the absorption lines thereof) and also the height of the cells so that they have predetermined values depending upon the intensity of the radiation and upon the shape of the absorption band of the receiver gas. Generally, the height of the second detector cell 6 is several times greater than that of the first cell 5.

On the other hand, the height of cell 4 must be determined in such manner that, even for the highest possible concentration of the gas to be measured in the mixture present in this cell, the maximum absorption of the rays the wave-length of which corresponds to the middle portions of the lines of the absorption band of the gas to be measured does not exceed a predetermined percentage. The value of this percentage may be for instance 20% and this for the more intensive lines which, for measurements according to the present invention, are the only ones to be taken into account.

By way of indication, I will now give the heights of cells 4, 5 and 6 used for determining the proportion of carbon monoxide (CO) in a mixture of said gas with nitrogen ($N_2$) where the relative amount of CO was about 4%. In this case, cells 5 and 6 were filled with a mixture of CO and $N_2$ in which the percentage of CO was 11%. The height of cell 4 was 25 mm., that of cell 5, 10 mm. and that of cell 6, 25 mm. For pressures of the mixture in cells 5 and 6 ranging from 400 mm. to 600 mm. of mercury, the sensitiveness (measurement effect) was practically constant.

It should further be noted that the means according to the invention have the advantage of a high selectivity. As a matter of fact, the absorbed energy due to the presence of a disturbing gas having an absorption band which overlaps that of the gas to be measured is generally more or less the same in the two detector cells and is therefore at least partly compensated for. It should be noted here that the measurement effect obtained with the device according to my invention is due to the preferential absorption by the first detector cell of rays the wave-lengths of which correspond to the middle portions of the most intensive lines of the absorption band of the gas to be measured, whereas this preferential effect does not act for the parasitic absorption of the disturbing gas if the middle portions of the lines which overlap only by their edges are sufficiently spaced apart.

In the contrary case, that is to say if compensation were not complete, the invention easily permits of taking supplementary compensatory steps, such for instance as filtering by gaseous layers constituted by disturbing gases and interposed across the path of travel of the beam, either before cell 5 or between cells 5 and 6.

When the residual disturbing effect is negative, it may be compensated by adding to the receiver gas some amount of the disturbing gas so as to produce a positive compensation effect of the same magnitude.

The advantages of the device according to my invention are considerable. They permit, with an apparatus much simpler and much less expensive, of obtaining, as to stability and selectivity of the measurement, better results than with the known methods.

They make it possible, due to the higher stability they ensure, to construct easily apparatus having an automatic compensation at zero, by acting through a servo-mechanism on shutter 11. In this case, the desired concentration is indicated by the position of shutter 11.

Furthermore, the fact of using for measurement of a gas in a mixture only the rays the wave-lengths of which are located inside the absorption bands thereof, permits of using the other rays of the same beam for simultaneously analyzing other components in the same apparatus. It then suffices to provide cell 6 with a transparent bottom and to dispose across the same beam other pairs of detector cells filled with other gases.

It has been explained above that the amount of energy absorbed from the ray beam in cell 4 must not exceed a given maximum averaging 20% when the apparatus 10 gives the difference between the energies absorbed respectively in cells 5 and 6, as shown by Fig. 1. As a rule, there is no difficulty in complying with this condition. However, for some analysis problems, a difficulty may occur.

For instance, if it is desired to measure traces of a gas in a mixture, the height of the cell 4 containing this mixture must be sufficiently great to give the sensitiveness necessary for measurement of concentrations which are normally very low. However it may happen, in some industrial applications, that, for accidental causes, the concentration of the gas to be measured increases suddenly beyond the limit that has been expected and the measurement may then become ambiguous because the difference of the absorptions in cells 5 and 6 starts decreasing when the rays are more and more absorbed in the cell which contains the mixture.

For instance, in an apparatus such as above described and which includes a cell 4 of a height equal to 200 mm., to measure percentages of carbon monoxide not higher than 0.1%; the same signal of 10 mv. is obtained in apparatus 10 for values of the percentage of CO equal respectively to 0.1 and to 10.

In order to remove any possibility of ambiguity of the measurement, it is then necessary to determine, in addition to the difference between the energies absorbed in cells 5 and 6, the absolute value of the energy selectively absorbed in cell 6. In this case it is particularly advantageous to measure the ratio of the signal corresponding to said difference and of the signal corresponding to the energy selectively absorbed in said cell 6.

Figure 2:
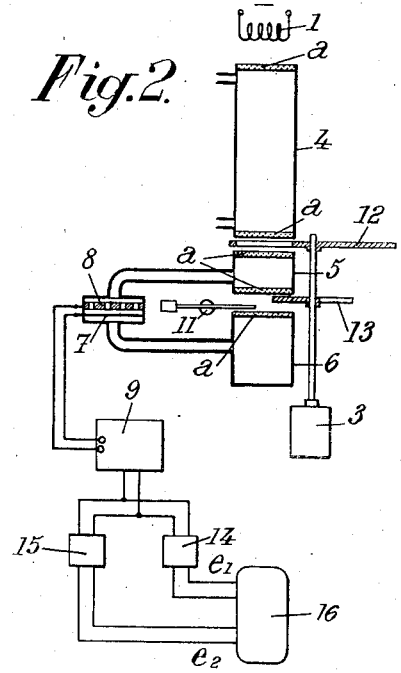
Fig. 2 is a similar view of a modification.

Fig. 2 shows an apparatus for measuring this ratio. The elements of the apparatus of Fig. 2 which have already been shown on Fig. 1 are designated by the same reference numerals.

In this case, the ray beam which passes through cells 4, 5 and 6 is not only periodically cut off at a given frequency, before entering cell 5, but also once more periodically cut off with a different frequency as it is passing between cells 5 and 6. The first mentioned interruption of the ray beam is obtained, in Fig. 1, by a rotating shutter 2 located upstream of cell 4. In the construction of Fig. 2, the same effect is obtained by a shutter 12 located between cell 4 and cell 5. The second interruption of the beam is obtained by means of another shutter 13 disposed between cells 5 and 6. The two shutters 12 and 13 may be fixed to the same shaft and driven by the same motor 3. However the frequencies of interruption must be different for the two elements 12 and 13.

The first shutter 12 gives a frequency of interruption of the beam leaving cell 4 equal to $f_1$, whereas the second shutter 13 gives a frequency of interruption $f_2$ for a portion of the beam entering cell 6.

Figure 3:
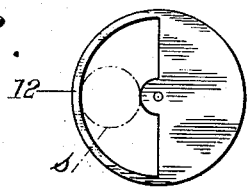
Figs. 3 and 4 show details of the device illustrated by Fig. 2.
Figure 4:
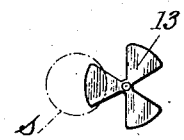

Fig. 3 shows a construction of shutter 12, the circle in dotted lines indicating the cross section $s$ of the beam. Fig. 4 shows a construction of shutter 13 which acts only upon a portion of the cross section $s$ of the beam and which gives for instance a frequency $f_2=3f_1$.

Of course, shutter 12, instead of being located between cells 4 and 5, might have been disposed between source 1 and cell 4.

The amounts of energy due to selective ray absorption in cells 5 and 6 act upon the opposed faces of the movable diaphragm 7 of the diaphragm condenser.

Due to the fact that the beam is interrupted twice with different frequencies, I obtain two signals. The first one, designated by $e_1$, is a differential signal of frequency $f_1$, and the second one, designated by $e_2$ and superimposed upon the first one, has a frequency $f_2$. The two signals $e_1$ and $e_2$, after being amplified in amplifier 9, are separated and rectified through a known device 14—15 containing filtering means. Their ratio is measured by a potentiometric measurement instrument 16.

By means of an adjustable shutter 11, it is possible to adjust the apparatus so that the differential signal $e_1$ is zero when the concentration of the gas to be measured in cell 4 is zero. This signal $e_1$ increases in accordance with the concentration of this gas in said cell 4. On the contrary, signal $e_2$ of frequency $f_2$ remains practically constant for normal variations of the concentration of the gas to be measured and starts decreasing only if this concentration is substantially in excess of the normal concentration value. If the absorption in cell 4 exceeds the limit that has been fixed, the reduction of the rays selectively absorbed in cells 5 and 6 has an analogous effect on the two signals $e_1$ and $e_2$, whereby the ratio measured by instrument 16 keeps increasing and does not risk to become ambiguous.

Another method for measuring the ratio of signals $e_1$ and $e_2$ would consist in producing a single frequency of interruption with the two shutters 12 and 13 but in bringing these two interruptions in difference of phase, so that the two signals $e_1$ and $e_2$ can be separated by phase discrimination by means of synchronized switches.

What ever be the means used for measuring the ratio of the two signals $e_1$ and $e_2$, I eliminate not only any ambiguity in the result of the measurement but I obtain at the same time that the result of the measurement is still less influenced by the possible presence in the mixture of other gases having absorption bands overlapping those of the gas to be measured. As a matter of fact, the absorption produced by such gases reduces both the main signal and the auxiliary signal so that the ratio remains practically unchanged.

Furthermore, by measuring the ratio of the two signals, the measurement becomes independent of the variations that may be undergone either by the intensity of the source of the ray beam or by the amplification.

Instead of using the signal $e_2$ by measuring the ratio of signals $e_1$ and $e_2$, I might, in some cases, merely observe the importance of the selective absorption in the second detector cell 6. As a matter of fact, the fact that this absorption undergoes an important reduction indicates that the result of the measurement may become ambiguous. In this case, the measurement of the absorption in cell 6 alone serves to give a warning signal.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims. For instance, the two detector cells are not necessarily both connected with a differential element such as a diaphragm condenser. They might remain separate from each other.

Also, the invention does not exclude the case where the gases present in the detector cells have different pressures and concentrations so as to facilitate measurement.

What I claim is:

1. A fluid analyzer apparatus for measuring the relative amount, in a mixture of fluids, of a given fluid component capable of selectively absorbing rays of given wave bands from a given ray beam passing therethrough, which comprises, in combination, a sample cell arranged to be filled with said fluid mixture to be analyzed, two detector cells both containing the same fluid, said last mentioned fluid having substantially the same ray absorption wave bands as said component, means for passing the same ray beam through said sample cell and both of said detector cells in series, and means connected to both said detector cells for comparing the respective amounts of energy absorbed by said two detector cells from said ray beam.

2. An apparatus according to claim 1 in which the dimension of the first detector cell in the direction in which said beam travels therethrough is smaller than the corresponding dimension of the second detector cell.

3. A fluid analyzer apparatus for measuring the relative amount, in a mixture of fluids, of a given fluid component capable of selectively absorbing rays of given wave bands from a given rays beam passing therethrough, which comprises, in combination, a sample cell arranged to be filled with said fluid mixture to be analyzed, two detector cells both containing the same fluid, said last mentioned fluid having substantially the same ray absorption wave bands as said component, means for passing the same ray beam through said sample cell and both of said detector cells in series, and means connected to both said detector cells for measuring the difference between the respective amounts of energy absorbed by said two detector cells from said ray beam.

4. An apparatus according to claim 3 further including a shutter disposed between said two detector cells and adjustable to indicate the concentration of the gas to be measured when the same amounts of energy are absorbed from said two detector cells, respectively.

5. An apparatus according to claim 3 further including means for measuring the absolute value of the amount of energy absorbed from said ray beam by the last detector cell.

6. An apparatus according to claim 5 in which the two last mentioned means are means for producing signals respectively proportional to the difference of the amounts of energy absorbed from said two detector cells and to the amount of energy absorbed by the last mentioned cell.

References Cited in the file of this patent

UNITED STATES PATENTS

| | | |
|---|---|---|
| 2,674,696 | Smith et al. | Apr. 4, 1954 |
| 2,688,089 | Williams | Aug. 31, 1954 |

FOREIGN PATENTS

| | | |
|---|---|---|
| 645,576 | Great Britain | Nov. 1, 1950 |
| 698,023 | Great Britain | Oct. 7, 1953 |